US00RE37914E

(19) United States
(12) Reissued Patent
Takei

(10) Patent Number: US RE37,914 E
(45) Date of Reissued Patent: Dec. 3, 2002

(54) ELECTRONIC KEYBOARD MUSICAL INSTRUMENT

(75) Inventor: Kunihiro Takei, Hamamatsu (JP)

(73) Assignee: Yamaha Corporation (JP)

(21) Appl. No.: 29/132,043

(22) Filed: Aug. 14, 2000

Related U.S. Patent Documents

Reissue of:
(64) Patent No.: Des. 413,917
Issued: Sep. 14, 1999
Appl. No.: 29/092,016
Filed: Aug. 11, 1998

(51) LOC (6) Cl. ..... 17-01
(52) U.S. Cl. ..... D17/1; D17/5
(58) Field of Search ..... D17/1, 2, 5, 6, D17/7, 9; D21/405; 84/174–177, 423, 428, 644, 670, 713, 744, DIG. 7

(56) References Cited

U.S. PATENT DOCUMENTS

| | | | | |
|---|---|---|---|---|
| D312,651 S | * 12/1990 | Yamawaki | D17/1 |
| D325,213 S | * 4/1992 | Mizushima | D17/1 |
| 5,157,213 A | * 10/1992 | Kashio et al. | 84/644 |
| D345,574 S | * 3/1994 | Mizushima | D17/1 |
| D372,930 S | * 8/1996 | Mura | D17/1 |

OTHER PUBLICATIONS

Yamaha Catalog, (PSS–790).*

* cited by examiner

*Primary Examiner*—Adir Aronovich

(74) *Attorney, Agent, or Firm*—Ostrolenk, Faber, Gerb & Soffen, LLP

(57) CLAIM

The ornamental design for an electronic keyboard musical instrument, as shown.

DESCRIPTION

FIG. 1 is a top view of an electronic keyboard musical instrument;
FIG. 2 is a front view thereof;
FIG. 3 is a rear view thereof;
FIG. 4 is a bottom view thereof;
FIG. 5 is a left-side view thereof; and,
FIG. 6 is a right-side view thereof.

1 Claim, 3 Drawing Sheets

Figure 1:
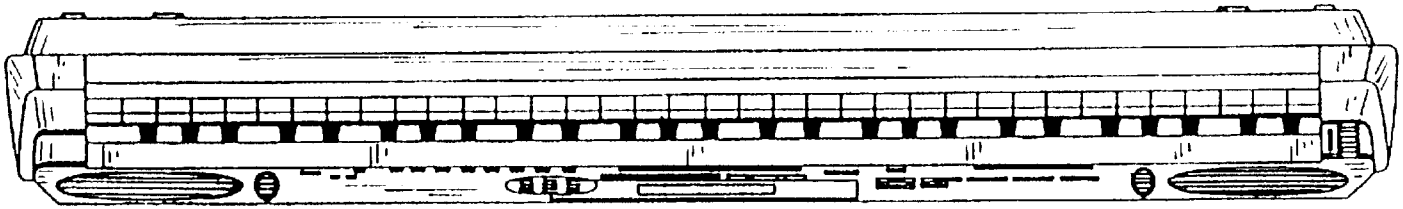
Figure 2:
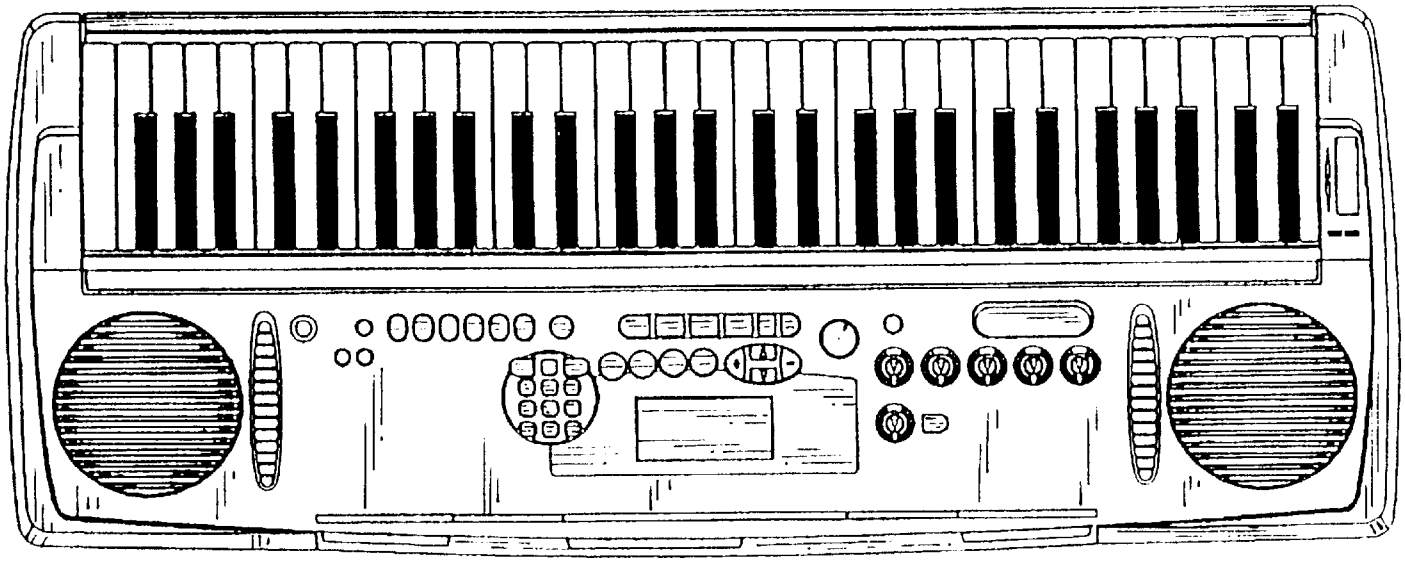
Figure 3:
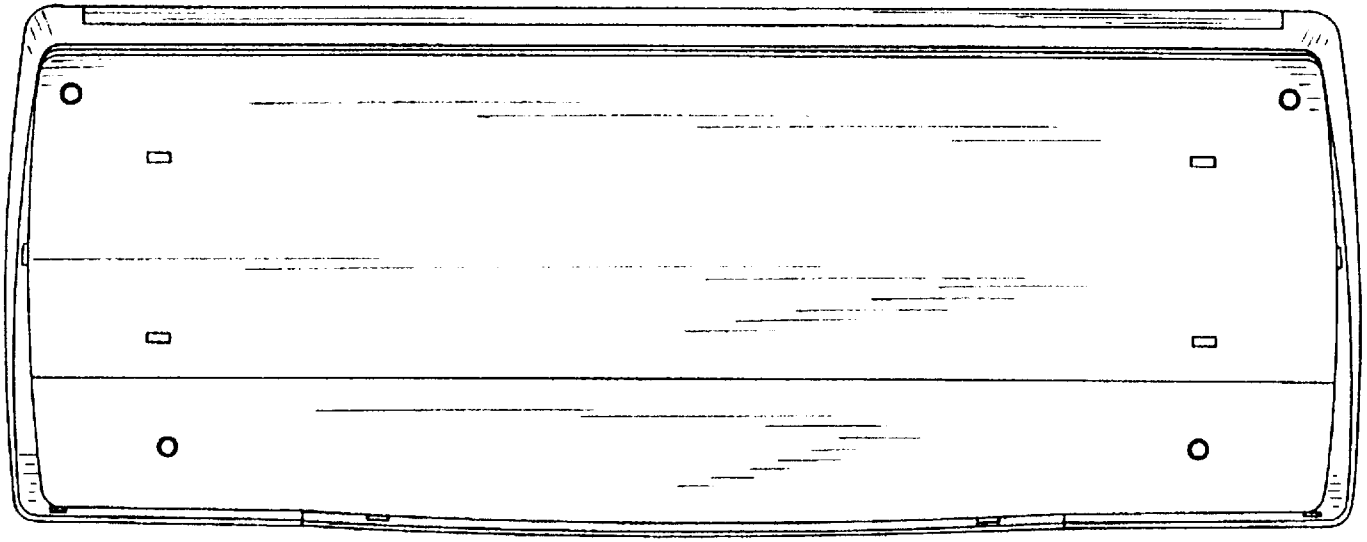
Figure 4:
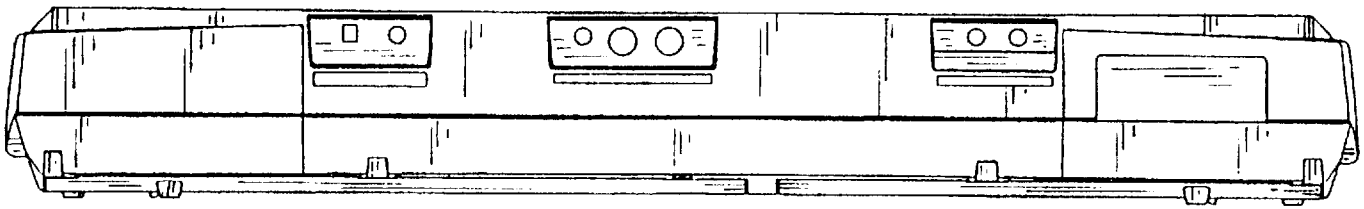
Figure 6:
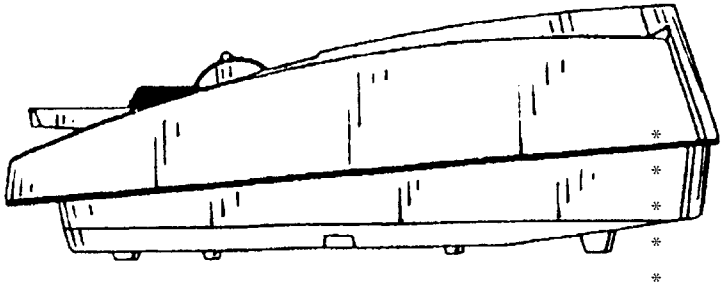
Figure 5:
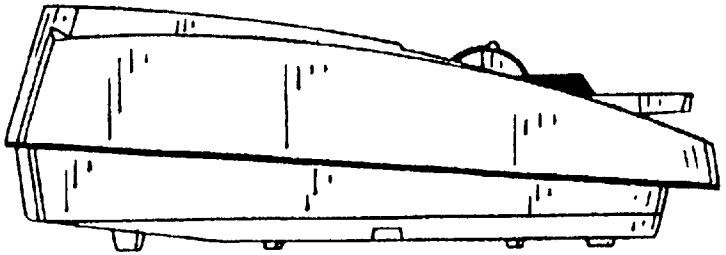

Matter enclosed in heavy brackets [ ] appears in the original patent but forms no part of this reissue specification; matter printed in italics indicates the additions made by reissue.